3,074,565
METHOD AND MEANS FOR FEEDING LOGS TO EQUIPMENT TO OPERATE THEREON SUCH AS A DEBARKING MACHINE
Walden M. Gaitten, Sylacauga, Ala., assignor to Soderhamn Machine Manufacturing Co., Talladega, Ala.
Filed June 2, 1959, Ser. No. 817,619
9 Claims. (Cl. 214—1)

The present invention relates broadly to the art of handling logs, especially logs of a length that are known as pulpwood material.

More particularly, this invention relates to a system for manipulating logs and feeding the same to processing equipment such as a debarking machine.

In many instances wherein logs that have been cut to length are fed to debarking machines, the problems of manipulating such logs in a manner such as to keep pace with the output or capacity of such barking machines are very acute.

Where pulpwood is being debarked by mechanisms that do not have a high feed rate, the manipulation of the log lengths to such mechanisms are not too critical. On the other hand, where the debarking machine has a high rate of feed, and a high productive capacity, such as the machine constructed in accordance with U.S. Patent 2,857,945 granted October 28, 1958, in the names of P. G. Brundell and K. E. Jonsson and entitled "Machine for Removing Bark From Logs," the proper feeding of the logs gives rise to many problems.

My prior filed application Serial No. 612,220 filed September 26, 1958, and entitled "Conveying System for a Debarking Machine," now Patent No. 2,916,064, dated December 8, 1959, discloses and claims a conveying system structure especially adapted for use with debarking machines constructed in accordance with the foregoing patent.

In pulpwood installations utilizing such a conveying system-debarking machine combination, it is desirous that the feed to the debarking machine be such as to attain an almost end to end movement of debarked logs on the outfeed conveyor section. It has been found that in such pulpwood installations, production is diminished to a great extent, due to the fact that it is extremely difficult to feed the pulpwood logs to the debarking machine so that the logs are moving more or less butt to butt. Once the logs are on the infeed conveying section, they of course move at a rate of feed coordinated with the rate of movement at which the individual logs can be debarked. However, the slow down in production is occasioned by the difficulties of feeding the logs to the infeed conveyor section. In addition, the cost of operation of an installation is increased due to the fact that more personnel are required to operate the various log handling and manipulating adjuncts that are necessary to place the logs on the infeed conveyor section. Accordingly, the present invention has for an object to provide a method and means for feeding logs to a debarking machine or other processing equipment in a manner to insure the logs follow one another in end to end relationship as closely as possible and to maintain a high efficiency of operation.

In connection with such handling of logs, it is to be pointed out that in most installations logs are brought by a truck, sling lift or other log handling equipment to a position adjacent the infeed conveyor and are there piled. It is necessary for the logs to be placed one at a time on the infeed conveyor section so as to travel endwise therealong to the debarking or other processing machine. In known pulpwood installations, the operator of the debarking machine is not in a position to control the feed of the logs to the infeed conveyor section for such debarking machine, and such installations require at least one more man to manipulate logs into the infeed conveyor section. In some installations, logs are placed on to a conveyor which is moved intermittently to position the logs on this conveyor generally in parallelism with the infeed conveyor section and a man utilizing a peavey or other device rolls the logs off of this first conveyor on to an infeed conveyor. The total output of the machine is thus dependent upon the movement of logs that can be handled by this first-mentioned conveyor, the stamina of the man that manipulates logs from that conveyor to the infeed conveyor and the operation of whatever device, such as a sling lift, grab loader or the like that delivers logs to the first conveyor. Accordingly, it is an object of the present invention to provide a log feeding system and method of operation which is under the control of the operator of the debarking machine or other processing equipment, so constructed and operated that this single operator is able to control the movement of the logs from an initial pile to and through the debarker so as to insure a butt to butt feeding relation. In other words, the logs are fed to the conveying system associated with the debarking machine in such manner that the outfeed from the debarker is substantially continuous.

It is a more specific object of this invention to provide an economically constructed and operated apparatus for handling or feeding logs, which, under the control of a single operator includes means for moving logs from an initial pile to an intermediate station, picking such logs up from such station one at a time and in rapid succession and depositing such logs on an infeed conveyor so that the same are moved in substantially continuously end to end relation to and through a debarking machine or other processing equipment.

Broadly, therefore, the invention includes a method of manipulating logs from a storage station to a point of utilization or work station which includes moving such logs transversely of their length to an intermediate station, impaling individual logs at such intermediate station and lifting the same to a predetermined position, dropping such logs from such position to a conveyor section and feeding such dropped logs in endwise relationship at a rate coordinated with the speed of lifting and dropping such that the logs are fed in substantially continuous end to end relationship.

It is a specific object of the invention to provide means for feeding logs in end to end relationship to a debarking machine or similar processing equipment, which includes a live conveyor means adapted to receive and feed logs in a direction transversely of their length, a bin means at the outfeed end of such conveyor means to receive such logs, a movable impaling means mounted to move from a position above such bin means downwardly into such bin means to impale a log and lift the same upwardly, a conveyor means adjacent said bin means for moving logs in a direction transverse to the direction in which they were moved by such first-mentioned conveyor means and means positioned above such last-mentioned conveyor means to release the logs from such impaling means so that they drop on to such last-mentioned conveyor means.

It is a still more specific object of this invention to provide such log impaling means in the form of fluid operated mechanism mounted for swinging movement about an axis parallel to the direction in which the logs are to be fed to the debarking machine. Further and more specific objects of the present invention will be apparent from the following description taken in connection with the accompanying drawing in which.

Figure 1:
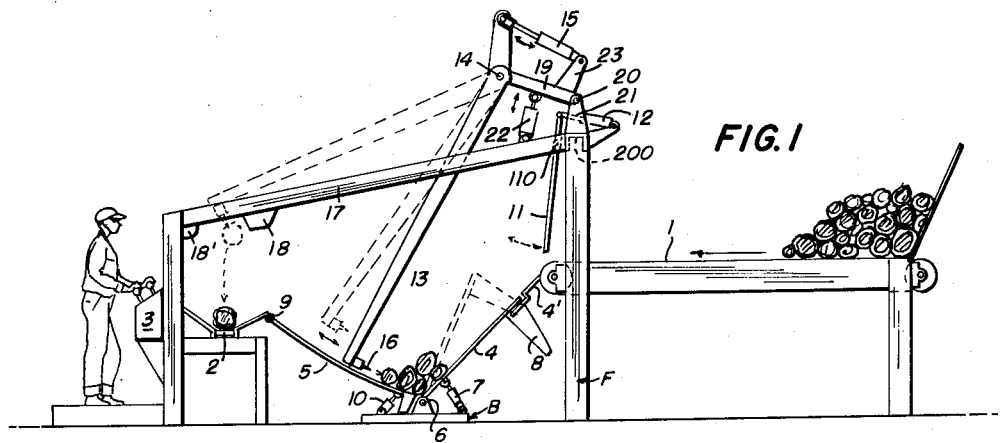
FIGURE 1 is a diagrammatic end elevational view of one form of the invention.
Figure 2:
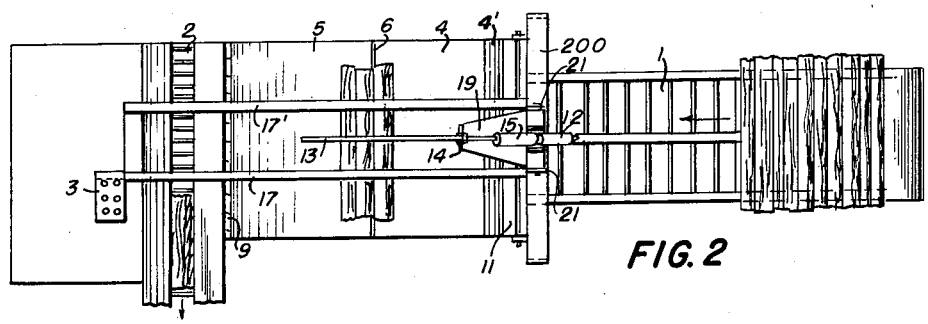
FIGURE 2 is a plan view of the arrangement shown in FIGURE 1.

It is to be pointed out that the drawings illustrate only those mechanical features that are in effect additive to the general arrangement disclosed in FIGURES 1 and 2 of my said prior Patent No. 2,916,064. In other words, the details of the debarking machine and the infeed and outfeed conveyor means associated therewith are not shown, except that the conveyor section 2 constitutes the infeed conveyor means for a debarking machine, and as set forth in my prior application that conveyor section effect feeding of logs longitudinally of their length to a debarking machine not shown. A control stand 3 is disposed adjacent the conveyor section 2 and at this control stand the operator controls not only the infeed and outfeed conveying system associated with the debarking machine, but also the debarking machine, as well as the various mechanical features shown in FIGURE 1. Spaced laterally from the conveyor section 2 is a live deck or chain conveyor 1 which receives logs from a sling lift or other suitable handling equipment and is capable of feeding the logs transversely of their length toward conveyor section 2. Between the outfeed end of conveyor means 1 and the side of conveyor section 2 is a bin or log receiving means. This bin or log receiving means in the form illustrated in FIGURE 1 is composed of two plate means 4 and 5. Plate 4 is pivoted at its lower edge by a pivot means shown at 6 to a suitable base B. A pneumatic or hydraulic cylinder and piston means shown at 7 is pivotally mounted between the base B and the undersurface of plate 4 so that this plate can be raised or lowered about pivot means 6. The upper edge of plate 4 has depending guard means of segmental form which when the plate 4 is raised to the dotted line position occupies a space between the plate 4 and a downwardly slanted stationary plate means 4' which extends between the outfeed end of conveyor 1 and the upper end of plate 4. When the plate 4 is in the full line position shown, the guard means 8 pass through slots not shown in the offset end of plate 4' so that a substantially smooth side wall is formed for one side of the bin. The plate means 5 is pivoted at its upper edge by pivot means 9 that are suitably incorporated with the upper edge or frame structure of the conveyor section 2. Another hydraulic or pneumatic cylinder and piston means 10 is operatively mounted between the base B and the undersurface of plate means 5 adjacent the lower edge thereof. There are additional segmental guard means 8' depending from below the undersurface of plate means 5 that occupy the space between the bottom of the bin of the pivot means 6 and the inner edge of plate means 5 when the latter is raised. The purpose of the pivotal mounting of plate means 4 and 5 is to permit agitation of any logs that are in the bin in response to actuation of the cylinder and piston means 7 and 10 respectively. The guard means 8 prevent any logs from falling into the space between plate means 4 and 4' and into the space that may form at the bottom of the bin when plate 5 is raised. This agitation of the side walls of the bin keep the logs more or less straight in the bin.

The movement of the logs along the conveyor means 1 into the bin is under the control of the operator and a pivotally mounted gate 11 operated by hydraulic or pneumatic cylinder and piston means 12 is also controlled by the operator in such fashion as to permit the control of the amount or number of logs delivered into the bin. When the gate 11 is moved to open position, by being swung about pivot means 110 in response to actuation of cylinder and piston means 12, logs will roll off the end of conveyor section 1 and down plates 4' and 4 to the bottom of the bin.

As shown in FIGURE 1, a few logs are at the bottom of the bin and in accordance with the invention, it is required that these logs be moved one at a time and placed on conveyor section 2 so as to move therealong in end to end relationship as closely spaced as possible. In order to move the logs from the bin to conveyor section 2, the invention includes a log impaling means which in this form consists of a swinging arm or pick shown generally at 13. This arm is pivoted about pivot means 14, supported on a frame or link means 19, one end of which is pivoted about pivot means 20 to the top end of an upstanding bracket means 21, carried by a cross piece 200 of a frame denoted generally at F. This frame or link means 19 is adjustable in position about the axis of pivot means 20 by a hydraulic or pneumatic piston and cylinder means 22 connected between the undersurface of frame or link means 19 and a component of frame F extending between the bars 17, 17' that form the top of frame F. Upstanding legs on the left hand side of conveyor section 2 being connected to the bars 17, 17'. The arm 13 is in the form of a double arm lever and the short arm thereof extends above pivot point 14. A suitable upstanding bracket means 23 carried by frame or link means 19 pivotally supports one end of the cylinder piston means 15, while the other end is pivoted to the free end of the short arm of the double arm lever 13.

Under the control of the operator, the cylinder piston means 15, connected to the short arm of the arm means 13 swings this arm means down into the bin. At the free end of the arm means or pick 13 is a spike 16 that is driven into a log in the bin by reason of the downward movement of the arm or pick 13. On reversal of movement of the piston and cylinder means, the impaled log is lifted upwardly till the log hits the arms 17, 17' that extend over the conveyor section 2. The log will be stopped by this impact and the spike will be extracted therefrom by continued upward movement of the arm means 13, thus, the log will be dropped on to the conveyor section 2. Depending guides 18, 18' are mounted so that any log which due to unbalance tends to rotate about spike 16, will be deflected into conveyor section 2.

It is to be pointed out that the distance from spike 16 to pivot point 14 is much greater than the distance or stroke of movement of the piston and cylinder means 15, so that the velocity of movement of spike 16 will be much greater than the velocity of movement of the piston and cylinder means 15.

Further, in order to be able to impale successive logs on approximately a radius thereof, it is necessary to adjust the clearance between the upper surface of plate 5 and the arc of movement of spike 16. Plate 5 is curved so as to agree generally with this arc of movement, and the adjustability of the height of pivot point 14, by actuation of piston and cylinder means 22 serving to pivot frame means 19 about the axis of pivot means 20 effects the necessary adjustment of the arc of movement of spike means 16.

As indicated previously, in operation the operator at station 3 will admit a limited number of logs into the bin by opening gate 11. If the logs are not lying parallel in the bin they will be agitated by actuating cylinder and piston means 7 and 10 to move the plate means 4 and 5. The impaling means is then actuated in response to movement of cylinder and piston means 15 to swing arm 13 and spike 16 downwardly so that the spike is driven into a log, usually that one nearest the operator. The cylinder and piston means is then reversed and the impaled log is moved upwardly until it abuts against the undersurface of arm means 17, 17' and the log drops on to the conveyor section 2, due to the spike being extracted by continued upward movement of the arm 13. The piston and cylinder means is reversed, the arm moves down to engage the next log and moves up so that the second log is dropped on to the conveyor section. The speed of movement of the conveyor section 2 is so related to the speed of movement of the stroke of arm means 13 that as one log moves out from beneath frame means 17, 17', the next log is just about in position to be dropped down on to the conveyor section 2. It is to be pointed out that pulpwood logs are usually cut to length and are substantially of uniform length such as 5 or 6 feet long. Logs of this length and say of anywhere from 5 to 8 inches in diameter can be impaled and lifted by a man manipulating a peavey. Therefore, since the stroke of movement of arm means 13 has substantial velocity, the spike means 16 are driven into a log with sufficient force as will insure lifting of that log until the log engages the undersurface of arm means 17, 17′. Therefore, under the control of the operator the impaling means is actuated to insure depositing of logs on conveyor section 2 at the proper rate, conveyor 1 and gate 11 being actuated intermittently to maintain a small but adequate supply of logs in the bin. If too many logs are in the bin, the efficiency of the agitating means is reduced.

Figure 3:
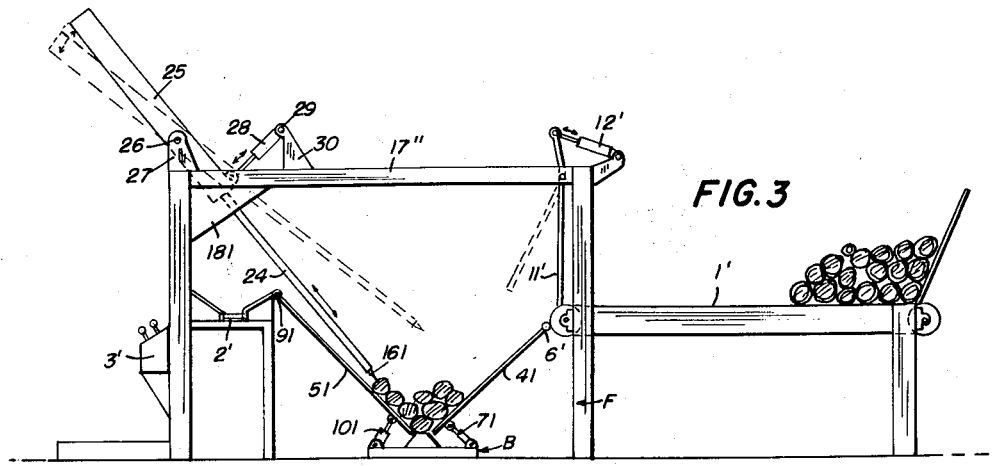
FIGURE 3 is a view similar to FIGURE 1 but illustrating a modified form of log impaling means.

The form of invention shown in FIGURE 3 operates similarly to that shown in FIGURES 1 and 2, although certain parts are of somewhat different construction. In that form of the invention, the movement of logs on conveying means 1′ is controlled by a gate means 11′ pivoted intermediate its length to the top bar means 17″ of the frame. The piston and cylinder means for actuating gate means 11′ is shown at 12′ and is pivoted about pivot means carried by the top of the frame. In this form of the invention, the structure of the bin is altered and thus as shown, plate means 41 is pivoted at its upper edge by pivot means 61 disposed adjacent the outfeed end of conveyor 1′. Plate means 51 is pivoted at its upper edge at 91 similarly to the FIGURE 1 arrangement, except that plate means 51 is straight rather than curved. Cylinder and piston means 71 and 101 mounted between the base B and the undersurface of the respective plate means 41 and 51 effect agitation of the logs in the bin. In this form of the invention the impaling means consist of a reciprocable cylinder and piston means, as opposed to a swinging arm. The cylinder 25 is pivotally mounted by a pivot means shown at 26 to upstanding frame components 27. A further piston and cylinder means 28 is pivotally connected between cylinder 25 and an upstanding bracket or support means 30 carried by the arm means 17″. This cylinder and piston means 28 is pivoted at 29. The actuation of cylinder and piston means 28 effects the same function as the actuation of cylinder and piston means 22 in the FIGURE 1 arrangement. Piston rod 24 that extends from the piston that is movable within cylinder 25 has formed at its outer end or attached thereto a spike means 161, which constitutes the impaler. Thus, this spike means is driven into a log when the piston is extended and as the piston is retracted the log is lifted until it engages the guide 181 which deflects the logs downwardly into conveyor section 21.

The arrangement shown in FIGURE 3, as indicated previously, operates similarly to the FIGURE 1 arrangement. The distance that the logs fall on the conveyor section 2 is not sufficient to unduly damage this conveyor section, which is a troughed type conveyor wherein an endless forwarding means moves along the bottom of the trough. If desired, suitable shock absorbing means in the form of springs or cylinder and piston arrangements can be associated with the infeed conveyor section, so as to cushion the fall of logs.

Picker arm 13 or piston 24 can be worked at such a speed that they stay ahead of conveyor 2 in the amount of material transported. Thus, the operator can let picker arm 13 or piston 24 hesitate above conveyor 2 before he again activates the arm, and the log is removed by beams 17. This allows the operator to control the spacings somewhat between the logs. This spacing between the logs is further controlled by the fact that conveyor 2 can run slightly faster than the infeed of the debarking machine.

What is claimed is:

1. Means for feeding logs to a work station such as a debarking machine, including a conveyor means adapted to receive and move logs in a direction transversely of their length, a bin means at the outfeed end of such conveyor means to receive such logs, a movable impaling means mounted to move from a position above such bin means downwardly into said bin means to impale a log and lift the same upwardly and laterally outwards of the bin means, a second conveyor means adjacent said bin means and on the side thereof opposite said first conveyor means for moving logs in a direction transverse to the direction in which they were moved by said first-mentioned conveyor means and means positioned above said second-mentioned conveyor means operative to release the logs from said impaling means so that successive released logs drop on to said second-mentioned conveyor means for transfer to said work station.

2. Means for feeding logs as claimed in claim 1 and said movable impaling means comprising an arm means swingably mounted for movement about pivot means having an axis above said bin means and parallel to said second-mentioned conveyor means, an impaler means carried by said arm means, means for swinging said arm means toward and away from the bottom of said bin means so as to impale a log in a swinging movement toward the bottom of the bin means and lift the same upwardly and laterally outwards in movement away from the bottom of the bin means and means for moving the position of the pivot means about which said arm means swings toward and away from the bottom of the bin means so as to adjust the arc of movement of the impaling means in relation to the bin means.

3. In mechanism for feeding logs to a debarking machine, a first conveyor means for moving logs longitudinally of their length to a debarking machine, a bin means adjacent one side of said conveyor means, a second conveyor means for feeding logs transversely of their length to said bin means, a frame structure including a top portion extending transversely of said first conveyor means, a movable impaling means carried by said frame means and including a component mounted to move from a position above the bin means downwardly into the bin means to successively impale logs therein and lift the same upwardly and laterally outwards of the bin means toward said top portion, said impaling means having a stroke of movement greater than the distance from the bottom of the bin means to the undersurface of said top portion, whereby an impaled log engages the top portion of the frame means and is thereby removed from such impaling means and drops on to said first conveyor means.

4. A log conveyor system including a live deck to receive logs, a hopper adjacent one end of said live deck, controllable means to admit logs from said live deck into said hopper a few at a time, a conveyor for moving logs placed thereon endwise, said conveyor lying adjacent said hopper on the side thereof opposite said live deck and extending parallel to the length of logs in said hopper, mechanical means including a spike arranged to impale logs in said hopper and raise the same to a position over said conveyor and abutment means engageable by such raised logs to release the same from said spike so that the logs drop onto said conveyor.

5. In mechanism for feeding logs to a debarking machine, a first conveyor means for moving logs longitudinally of their length to a debarking machine, a bin means adjacent one side of said conveyor means, said bin means including movable wall portions, means for moving said wall portions so as to agitate logs therein to dispose the same in substantial parallelism with said first-mentioned conveyor means, a second conveyor means for feeding logs transversely of their length to said bin means, a frame structure including a top portion extending transversely of said first conveyor means, a movable impaling means carried by said frame means and including a component mounted to move from a position above the bin means downwardly into the bin means to successively impale logs therein and lift the same upwardly and laterally outwards of the bin means toward said top portion, said impaling means having a stroke of movement greater than the distance from the bottom of the bin means to the undersurface of said top portion, whereby an impaled log engages the top portion of the frame means and is thereby removed from such impaling means and drops on to said first conveyor means.

6. A log conveyor system including a live deck to receive logs, a hopper adjacent one end of said live deck, controllable means to admit logs from said live deck into said hopper a few at a time, a conveyor for moving logs placed thereon endwise, said conveyor lying adjacent said hopper on the side thereof opposite said live deck and extending parallel to the length of logs in said hopper, impaling means mounted above said hopper and including a first arm means supported for swinging movement about an axis parallel to said conveyor, said arm means having a free end, a second arm means pivotally connected to the free end of the first arm means for swinging movement about an axis parallel to the axis of said conveyor, a spike means carried by said second arm means, means for swinging said second arm means into and out of said hopper to impale logs in said hopper and raise the same to a position over said conveyor, and abutment means over said conveyor and engageable by such raised logs so as to release such logs from such spike means so that the logs drop on to such conveyor.

7. A log conveyor system including a live deck to receive logs, a hopper adjacent one end of said live deck, controllable means to admit logs from said live deck into said hopper a few at a time, a conveyor for moving logs placed thereon endwise, said conveyor lying adjacent said hopper on the side thereof opposite said live deck and extending parallel to the length of logs in said hopper, impaling means mounted above said hopper and including a first arm means supported for swinging movement about an axis parallel to said conveyor, said arm means having a free end, a second arm means pivotally connected to the free end of the first arm means for swinging movement about an axis parallel to said conveyor, a spike means carried by said second arm means, means for swinging said second arm means into and out of said hopper to impale logs in said hopper and rise the same to a position over said conveyor, means for swinging said first arm means so as to adjust the arc of movement of said spike means, and abutment means over said conveyor and engageable by such raised logs so as to release such logs from such spike means so that the logs drop on to such conveyor.

8. A log conveyor system including a live deck to receive logs, a hopper adjacent one end of said live deck, controllable means to admit logs from said live deck into said hopper a few at a time, a conveyor for moving logs placed thereon endwise, said conveyor lying adjacent said hopper on the side thereof opposite said live deck and extending parallel to the length of logs in said hopper, a piston and cylinder means pivotally mounted for swinging movement about an axis parallel to and generally above said conveyor, said piston and cylinder means including an elongated rod extendable into and wtihdrawable from said hopper, spike means carried by said rod for impaling logs in said hopper, means for swinging said piston and cylinder means relative to said hopper so that said rod can be extended to impale logs in said hopper and raise the same to a postiion over said conveyor, and abutment means over said conveyor and engageable by such raised logs so as to release such logs from such spike means so that the logs drop on to such conveyor.

9. A log conveyor system including a live deck to receive logs, a hopper adjacent one end of said live deck, controllable means to admit logs from said live deck into said hopper a few at a time, said hopper including downwardly converging plate means, means pivoting each plate means along an edge that is parallel to logs lying in said hopper, means operably connected with said plate means for moving the same to agitate logs lying in said hopper, a conveyor for moving logs placed thereon endwise, said conveyor lying adjacent said hopper on the side thereof opposite said live deck and extending parallel to the length of logs in said hopper, mechanical means including a spike arranged to impale logs in said hopper and raise the same to a position over said conveyor and abutment means engageable by such raised logs to release the same from said spike so that the logs drop onto said conveyor.

References Cited in the file of this patent
UNITED STATES PATENTS

| 698,774 | Whitehead | Apr. 29, 1902 |
| 702,639 | Dutemple | June 17, 1902 |
| 1,464,769 | McLarty | Aug. 14, 1923 |
| 1,525,197 | Ranger | Feb. 3, 1925 |
| 2,412,137 | Fink | Dec. 3, 1946 |
| 2,563,867 | Rathert | Aug. 14, 1951 |
| 2,661,099 | Falconer | Dec. 1, 1953 |
| 2,735,713 | Blakely | Feb. 21, 1956 |
| 2,750,024 | Gurewitz | June 12, 1956 |
| 2,876,815 | Rogers | Mar. 10, 1959 |